Figure 1:
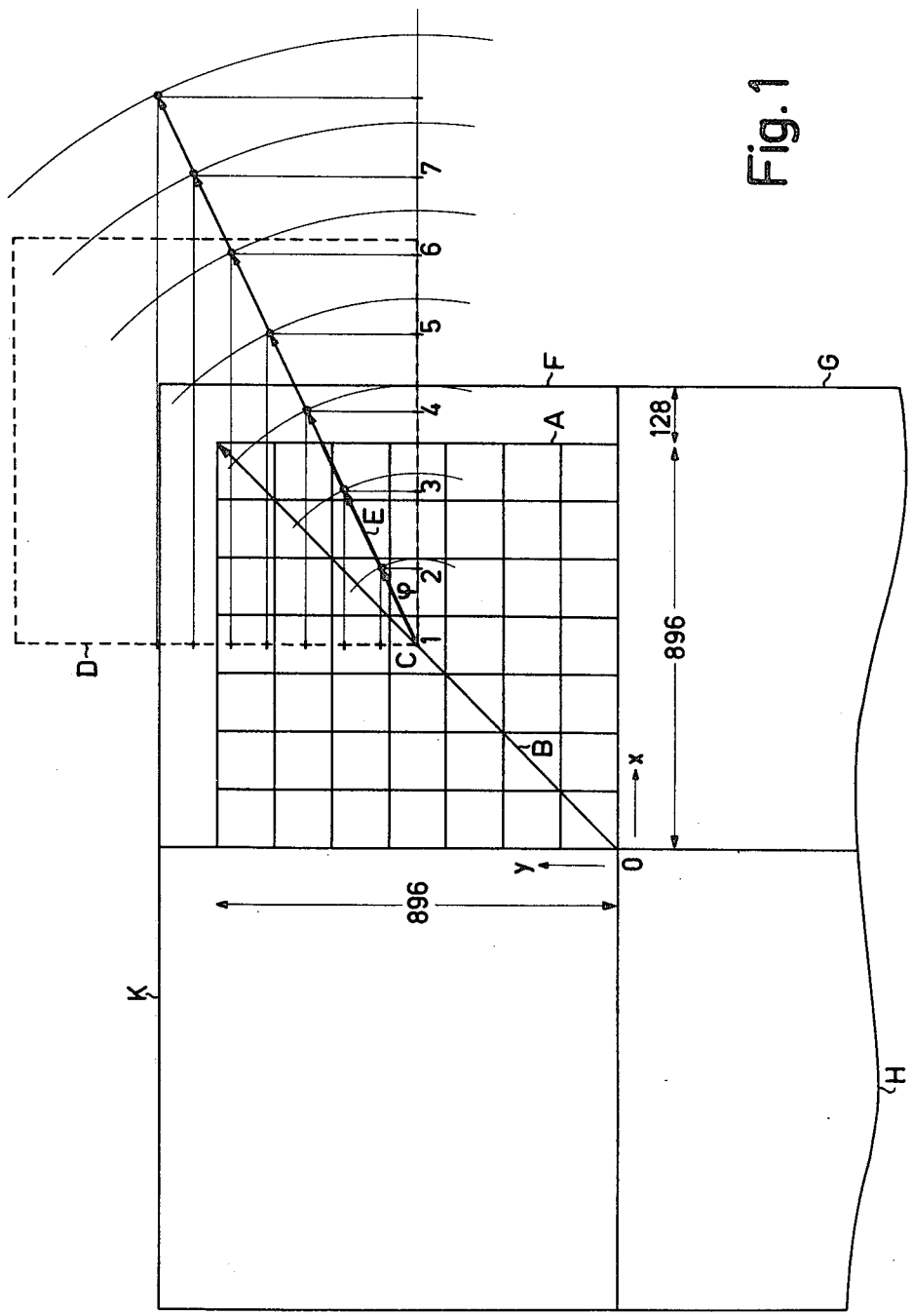

United States Patent [19]
Brands et al.

[11] 4,128,838
[45] Dec. 5, 1978

[54] DIGITAL SCAN CONVERTER

[75] Inventors: Antoon H. Brands, Borne; Jouke Gietema, Hengelo both of Netherlands

[73] Assignee: Hollandse Signaalapparaten B.V., Hengelo, Netherlands

[21] Appl. No.: 765,937

[22] Filed: Feb. 7, 1977

[30] Foreign Application Priority Data

Feb. 16, 1976 [NL] Netherlands .................. 7601535

[51] Int. Cl.$^2$ ..................... G01S 7/06; G01S 9/02
[52] U.S. Cl. ............................................. 343/55 C
[58] Field of Search ................................. 343/55 C

[56] References Cited

U.S. PATENT DOCUMENTS

| | | | |
|---|---|---|---|
| 3,683,373 | 8/1972 | Barnes et al. | 343/55 C X |
| 3,765,018 | 10/1973 | Heard et al. | 343/55 C |
| 3,810,174 | 5/1974 | Heard et al. | 343/55 C X |
| 4,002,827 | 1/1977 | Nevin et al. | 343/55 C |

*Primary Examiner*—Malcolm F. Hubler
*Attorney, Agent, or Firm*—Algy Tamoshunas

[57] ABSTRACT

In a digital scan converter for displaying video data provided by a radar sensor on a raster scan display, the video data is stored in a radar input buffer at addresses corresponding to the pattern according to which the field of view of the radar sensor is scanned, and taken over in a random-access memory. The random-access memory consists of $N \times N$ submemories, all containing $a \times a$ memory elements and all being simultaneously accessible. For the range scan in any azimuth value ($\phi$) the range considered is divided into $n$ ($n \leq N$) segments of each i k range increments $\Delta r$, where the length $k\Delta r$ of each of said segments equals at least the range represented by "$a$" memory elements, multiplied by a factor $\sqrt{2}$. An address generating circuit generates the addresses $x = x_c + (lk+m)\Delta r \cos \phi$ and $y = y_c + (lk+m)\Delta r \sin \phi$ where $x_c$ and $y_c$ represent the coordinates of the radar sensor position, $l = 0, 1, 2, \ldots, n-1$ in each memory cycle, and $m = 0, 1, 2, \ldots, k-1$, to accommodate the data read from the input buffer in the random-access memory at locations corresponding to the display line pattern to be realized on the raster scan display. The relevant data for each picture line is read from the respective N submemories simultaneously and placed in a picture-line memory storing the data of a picture line in order to be readout in the sequence as required for representation on the raster scan display.

2 Claims, 2 Drawing Figures

DIGITAL SCAN CONVERTER

The invention relates to a digital scan converter for displaying video data, provided by a radar sensor, on a raster scan display, which digital scan converter comprises:

a. a radar input buffer, storing the detected and quantised video signals at addresses corresponding to the pattern according to which the field of view, determined by the radar sensor in azimuth and range coordinates, is scanned at a given (first) rate;

b. a random-access memory for receiving data from the radar input buffer;

c. an address generating circuit for generating addresses as function of the scan pattern and scanning rate to accommodate the data read from the input buffer in the random-access memory at locations corresponding to the display line pattern to be realised on the raster scan display;

d. a readout unit for reading out the data stored in the random-access memory and to be presented on the raster scan display at a given (second) rate;

e. a timing unit providing the control signals required for the operation of the digital scan converter.

Such a digital scan converter is disclosed in U.S. Pat. No. 3,765,018. Scan conversion systems find their application, for example, in the display of radar pictures in rooms with high ambient illumination, calling for a flicker-free display of high intensity. A high intensity requires an effective phosphor with an inherent short persistence. This necessitates the application of a memory in which the radar data is read out several times per second for presentation on a raster scan display.

The data required for reproduction on the display is to be read from the random-access memory (RAM). To this effect, an R (read) period of $p_1$ μsec is assigned in a memory cycle. Moreover, the data read from the radar input buffer is to be applied to the memory, while the data written into memory is or may be the result of the data applied and that already contained in the memory. For this purpose an RMW (read/modify/write) period of $p_2$ μsec is assigned in a memory cycle.

The RAM consists of as many memory elements as there are picture elements in the raster, so that the data represented by one picture element is contained in one corresponding memory element. The capacity of such a memory element is sufficient for one or several bits. When using a raster of $b$ picture lines, the RAM contains $b^2$ memory elements. For practical and economical reasons, the RAM is based on 1k or 4k memory modules such as used in computers. To avail of all memory capacity, the number of picture elements should be a multiple of 1024 or 4096, depending on the use of 1k or 4k memory modules, on the assumption that a memory element comprises only one bit. This determines the number of modules in the RAM, as well as the number of memory elements that can be read out in parallel.

If $q$ elements of the RAM are read out in parallel, the data representing $b$ picture lines of each $b$ picture elements is read out in $b^2/q$ memory runs, thus in $(b^2/q) \cdot p_1$ μsec. If $f_t$ denotes the picture reproduction frequency, the data readout takes up $(b^2/q)f_t p_1$ μsec per second. If, on the other hand, different data is to be read from memory for two raster scan displays, the readout takes $2(b^2/q)f_t p_1$ μsec per second.

In the digital scan converter as set forth in the opening paragraph, the rate at which radar data is loaded into memory depends on the pulse repetition frequency $f_h$ of the radar sensor and the maximum range scan usable for radar video reproduction on the raster scan display. If, in a raster of $b$ picture lines of each $b$ picture elements, the distance between two adjacent picture elements corresponds to the length of one range increment, then theoretically, the maximum number of range increments in each range scan is $b\sqrt{2}$, corresponding to the same number of picture elements. With an RMW period of $p_2$ μsec the writing of the radar data arriving in one range scan takes up $bp_2\sqrt{2}$ μsec, while $bf_h p_2\sqrt{2}$ μsec per second is spent on this writing.

Due to writing and reading of data, the RAM is occupied for $2(b^2/q)f_t p_1 + bf_h p_2\sqrt{2}$ μsec per second. If $p_1 = 0.45$ μsec and $p_2 = 0.75$ μsec with a pulse repetition frequency $f_h = 4096$ Hz and a non-interlaced picture reproduction frequency $f_t = 55$ Hz, the RAM is occupied for $49.5(b^2/q) + 4344.4 b$ μsec per second. It should be noted that such a picture reproduction frequency, deviating from normal raster scan systems, is due to special circumstances associated with the application in question, viz. a short viewing range. Writing and reading may jointly take approximately 95% of the available time. The remaining time is to be reserved for other processes which may be left out of consideration for a good understanding of the invention. Therefore:

$$49.5 \frac{b^2}{q} + 4344.4b < 0.95 \times 10^6 \text{ or } b < 218.7 - 0.0114 \frac{b^2}{q}.$$

With the application of 1k memory modules, $b^2/1024$ of such memory modules are required to form the memory, permitting theoretically a parallel readout of maximum $q = b^2/1024$ memory elements, giving $b < 207$. Similarly, with the application of 4k memory modules, $b < 172$. In the cited U.S. patent the number of picture lines is therefore fixed at 128. If it is desired to increase the number of picture lines and to use a substantially finer raster, e.g. of 896 × 896 picture elements, a memory organisation as described above is inadequate. It is therefore an object of the present invention to provide a digital scan converter as set forth in the opening paragraph, in which the memory organisation permits a more accurate picture reproduction with a fine raster.

According to the invention, the random-access memory has N × N submemories, all containing $a \times a$ memory elements and all being simultaneously accessible, while for the range scan in any azimuth value ($\phi$) the range considered is divided into $n$ ($n \leq N$) segments of each $k$ range increments $\Delta r$, where the length $k\Delta r$ of each of said segments equals at least the range represented by "$a$" memory elements, multiplied by a factor $\sqrt{2}$. The address generating circuit consists of a convential azimuth counter and sine/cosine generator, a start address generator delivering the start address values $lk\Delta r \cos \phi$ and $lk\Delta r \sin \phi$ (where $l = 0, 1, 2, \ldots, n-1$) on the supply of the signals from the sine/cosine generator, and an increment address generator that, considering said $n$ start addresses, increments all $n$ start addresses by $\Delta r \cos \phi$ and $\Delta r \sin \phi$ in each random-access memory cycle, generating in $k$ successive random-access memory cycles, the addresses $x = x_c + (lk+m)\Delta r \cos \phi$ and $y = y_c + (lk+m)\Delta r \sin \phi$, where $x_c$ and $y_c$ represent the coordinates of the radar sensor position, $l = 0, 1, 2, \ldots, n-1$ in each memory cycle, and $m = 0, 1, 2, \ldots, k-1$ whereby further the stored data of the radar input buffer, corresponding to the n ranges of which the addresses are defined in each memory cycle, is transferred to the $x$ and $y$ address-defined positions of the random-access memory in the respective memory cycle, allocating a position within one submemory by one address only, and whereby for each picture line the relevant data is read from the respective N submemories simultaneously, while said readout unit contains at least one picture-line memory storing the data of a picture line in order to be readout in the sequence as required for presentation on the raster scan display.

If it is necessary to readout from memory different information for two raster scan displays, this takes up only $2(b^2/q^N)f_t p_1$ μsec per second. In this expression, $q$ is the number of memory elements readout in parallel from a submemory. Similarly, the writing of radar data now takes up only $$\frac{b\sqrt{2}}{N} f_h p_2$$

μsec per second.

If the write-read operation is to occupy only 95% of the available time, then $$2 \frac{b^2}{qN} f_t p_1 + \frac{b\sqrt{2}}{N} f_h p_2 < 0.95 \times 10^6.$$

With $p_1 = 0.45$ μsec, $p_2 = 0.75$ μsec, $f_h = 4096$ Hz and $f_t = 55$ Hz, this relationship becomes $$b < 218.7 N - 0.0114 \frac{b^2}{q}.$$

With the application of $1k$ memory modules, $$(\frac{b}{N})^2 \frac{1}{1024}$$

of such memory modules are required to form the submemory, permitting a readout of maximum $$q = (\frac{b}{N})^2 \frac{1}{1024}$$

memory elements in parallel, so that $b^2/q = 1024 N^2$ and $b < 218.7 N - 11.7 N^2$. As already stated, the submemories contain $a \times a$ memory elements, where $a = (b/N)$. In connection with the addressing of the memory elements, it is desirable that $(b/N) = 2^y$, where $y$ is an integer. It should be noted that $$\frac{b}{N} = 2^y < \left[ \frac{d}{dN} (218.7 N - 11.7 N^2) \right] N = 0$$

to satisfy the relationship $b < 218.7 N - 11.7 N^2$. The relationship $$q = (\frac{b}{N})^2 \frac{1}{1024}$$

can now be written as $32 \sqrt{q} = 2^y < 218.7$; which is satisfied only for the values $q = 1, 4$ and $16$. Consequently, $b/N$ can assume only the values 32, 64 or 128, the largest number of picture lines satisfying the relationship $b < 218.7 N - 11.7 N^2$ is now attained when N = 7; the number of picture lines then amount to 896. Similarly, it can be shown that with the application of $4k$ memory modules, which should have to be used in the 64 × 64 configuration as well, the largest possible number of picture lines is 192, with a memory division of 3 × 3 submemories. Hence, an optimal result will be obtained only with the use of $1k$ memory modules, while the number of picture lines $b = 896$ and the memory is split into 7 × 7 submemories of each 128 × 128 memory elements.

Figure 2:
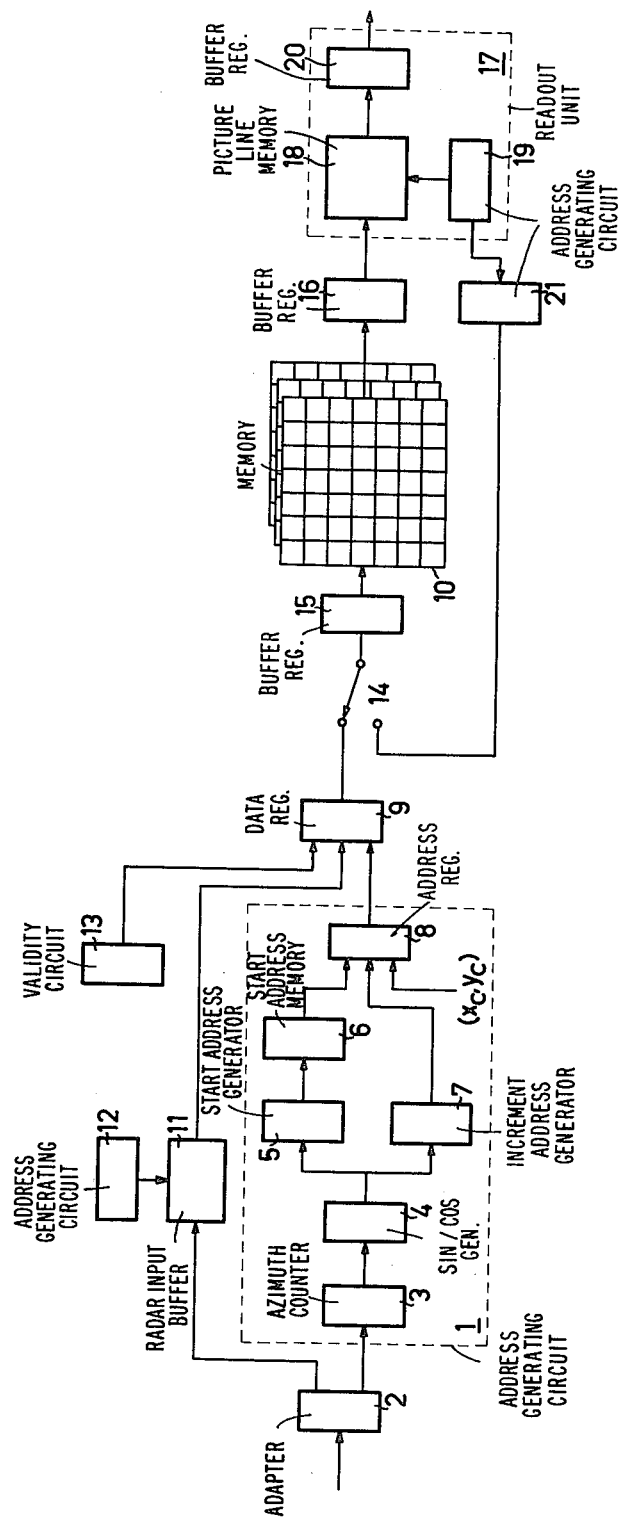

The invention will now be further explained on the basis of these parameters and with reference to the following figures, in which:

FIG. 1 shows in one illustration a number of diagrams used for the correct interpretation of the invention, including a raster division corresponding to the memory division into 7 × 7 submemories and two range scans; and FIG. 2 illustrates a block diagram of the digital scan converter according to the invention.

From the above it will be understood that the invention is not limited to the chosen, though optimal parameters. The system could perform just as well with a reduced number of picture lines and a suitable memory division into submemories.

The raster designated by A in FIG. 1 has 896 picture lines each of 896 picture elements, while the distance between adjacent picture elements corresponds to the length of one range increment $\Delta r$. The raster is considered to be built up of 7 × 7 parts each of 128 × 128 picture elements, corresponding to the memory division into submemories.

Assuming that the position of the radar sensor is at the origin O of the raster, the maximum range scan considered for reproduction corresponds to the diagonal B of the raster. The total range considered for reproduction is divided into $n$ segments of $k$ range increments $\Delta r$, where the maximum number of segments is such that $n = N = 7$ of these segments are used for the maximum range considered for reproduction, permitting the writing of the radar data of these 7 range segments simultaneously, since the submemories are randomly accessible. Although it is sufficient that $k$ assumes the value $128 \sqrt{2} = 182$, $k$ is chosen to be 192 to facilitate the digitisation. The maximum range considered for reproduction is therefore composed of $7 \times 192 = 1344$ range increments; however, no more than $896 \sqrt{2} = 1268$ range increments can be displayed. To write the information of the 7 range segments here considered simultaneously into memory, first the addresses of the picture elements, i.e. of the memory elements corresponding thereto, (0, 0), (192 cos 45°, 192 sin 45°), (384 cos 45°, 384 sin 45°), (576 cos 45°, 576 sin 45°), (768 cos 45°, 768 sin 45°), (960 cos 45°, 960 sin 45°), (1152 cos 45°, 1152 sin 45°), hereinafter called start addresses, must be generated, followed by the addresses (cos 45°, sin 45°), (193 cos 45°, 193 sin 45°), . . . , (1153 cos 45°, 1153 sin 45°), and thereafter the addresses (2 cos 45°, 2 sin 45°), (194 cos 45°, 194 sin 45°), . . . , (1154 cos 45°, 1154 sin 45°), etc. Thus a number of 192 cycles are necessary to write the respective data into the memory.

Assuming that the position of the radar sensor is at the centre C of the raster, the range considered for reproduction falls entirely within the distance of $n = 3$ segments of 192 range increments with a range scan E. Now the start addresses (448, 448), (448 + 192 cos $\phi$, 448 + 192 sin $\phi$), (448 + 384 cos $\phi$, 448 + 384 sin $\phi$)

must first be defined, followed by the addresses (448 + cos $\phi$, 448 + sin $\phi$), (448 + 193 cos $\phi$, 448 + 193 sin $\phi$), (448 + 385 cos $\phi$, 448 + 385 sin $\phi$), and thereafter the addresses (448 + 2 cos $\phi$, 448 + 2 sin $\phi$), (448 + 194 cos $\phi$, 448 + 194 sin $\phi$), (448 + 386 cos $\phi$, 448 + 386 sin $\phi$), etc. The $x$ values of these start addresses are designated by 1, 2 and 3 in FIG. 1. The numerals 4, 5 and 6 designate the remaining x values of the start addresses, which would be of concern if the same range scan had been performed with the radar sensor at the origin of the raster. In this situation the raster could be represented by the dotted square D. The start address value 7 will be of importance only if the radar sensor is considered to be at the origin of the raster and the range scan is diagonal or substantially diagonal.

In general it may be stated that if the radar sensor is considered to be at the position $(x_c, y_c)$ of the raster and the range considered for reproduction falls fully within $n(n \leq N)$ segments each of $k\Delta r$ range increments, the start addresses may be represented by $x = x_c + lk\Delta r \cos \phi$ and $y = y_c + lk\Delta r \sin \phi$, where $l = 0, 1, 2, \ldots, n-1$. The addresses $x = x_c + (lk+m)\Delta r \cos \phi$ and $y = y_c + (lk+m)\Delta r \sin \phi$, where $m = 0, 1, 2, \ldots, k-1$, are then generated in succession in $k$ memory cycle times following after the definition of the start addresses.

The method of addressing here described is realised by the address generating circuit 1 in FIG. 2. An adapter 2 passes the relevant data of the radar sensor to the address generating circuit, viz. the azimuth pulses representing the radar antenna position and a pulse representing a reference angle. The address generating circuit 1 consists of an azimuth counter 3, a sine/cosine generator 4, a start address generator 5, a start address memory 6, an increment address generator 7 and an address register 8. Pulses from the adapter 2 are applied to the azimuth counter 3, which delivers a signal representing the angle $\phi$ between the direction in which the radar equipment emits the transmitter pulses and a chosen reference direction. The $\phi$ signal is supplied to the sine/cosine generator 4, generating the signals sin $\phi$ and cos $\phi$. The start address generator 5 determines the values:

$$\begin{cases} 0, k\Delta r \cos \Phi, 2k\Delta r \cos \Phi, \ldots, (n-1)k\Delta r \cos \Phi \\ 0, k\Delta r \sin \Phi, 2k\Delta r \sin \Phi, \ldots, (n-1)k\Delta r \sin \Phi \end{cases}$$

these start addresses can be stored in a start address memory 6 during the period of a range scan. On the supply of the signals sin $\phi$ and cos $\phi$ the increment address generator 7 produces the increment values $m \alpha r \cos \phi$ and $m \alpha r \sin \phi$, $(m = 0, 1, 2, \ldots (k-1)$ successively, incrementing the start addresses $k$ times in each range scan. The incrementing of the start addresses occurs in the address register 8, which receives in each range scan the addresses $$\begin{cases} m\Delta r \cos \Phi, (k+m)\Delta r \cos \Phi, (2k+m)\Delta r \cos \Phi, \ldots, \\ \qquad ((n-1)k+m)\Delta r \cos \Phi \\ m\Delta r \sin \Phi, (k+m)\Delta r \sin \Phi, (2k+m)\Delta r \sin \Phi, \ldots, \\ \qquad ((n-1)k+m)\Delta r \sin \Phi \end{cases}$$

where $m = 0, 1, 2, 3, \ldots, (k-1)$ successively, incremented by $(x_c, y_c)$, i.e. incremented by the address of the element representing the position of the radar sensor.

This method of addressing the random-access memory, designated by 10 in FIG. 2, is adapted to the fact that, in the conversion system here described, where memory 10 consists of 7 × 7 random-access submemories, the video signal supplied by the radar sensor and quantized in adapter 2, cannot be stored directly into the random-access memory 10; for this purpose, a radar input buffer 11 is employed. With each range increment $\Delta r$ the radar video data is written into buffer 11 in synchronism with the range scan. Considering again the range scan B shown in FIG. 1, the radar video data of the range increments 0, 1, 2, . . . , 1344 successively, will in principle be stored in the radar input buffer 11. On the other hand, the radar input buffer 11 is readout in a completely different sequence. In the first memory cycle, the data of the range increments 0, 192, 384, . . . , 1152 is readout, in the second cycle the data of the range increments 1, 193, 385, . . . , 1153 and in the 192nd cycle the data of the range increments 191, 383, 575, . . . , 1344. The above read-in and read-out sequence of the radar input buffer 11 is determined by the address generating circuit 12. The video data of the range increments 1269 – 1344 is however ignored in practice, since the maximum number of range increments of which radar data is suitable for display on the raster is 896 $\sqrt{2}$ = 1268 for the chosen parameters.

The radar video data of a range increment may be represented by a plurality of bits; in such a case, the capacity of the radar input buffer 11, and also that of the random access memory 10, should be adapted thereto. If the radar video data of a range increment consists of say 3 bits, each memory element of input buffer 11 and of memory 10, containing 896 × 896 memory elements, comprises 3 bit positions. Since the design of memory 10 is of prime importance to the present invention, FIG. 2 shows this in the form of an 896 × 896 × 3 memory.

As to the addressing of memory 10 containing 896 × 896 picture elements, it is sufficient to supply the $x$ and $y$ addresses of the picture elements in 10 bits. The data register 9 thereto contains:

1. the 10 bit $x$ and $y$ addresses of an element of memory 10, which addresses are received from address register 8;
2. the radar video data from the radar input buffer 11 in 3 bits relative to the cited example; and
3. one validity bit, produced by the validity circuit 13; this bit indicates that both the range increment, which is the source of the radar video data, falls within the range considered for display, and that the addressing is such that radar video data of elements from adjoining address areas covered by $x$ and $y$ addresses is not displayed.

The latter may be explained as follows: In FIG. 1 the 896 × 896 raster A may be regarded as a display area, of which each element is allocated by a corresponding element from the address area F containing the 1024 × 1024 address elements. The data of addresses of which the $x$ and $y$ values lie between 896 and 1024 is dropped automatically, as no memory is provided. Data outside this address area, i.e. data from the adjoining address areas, such as G, H and K, should however be declared void. For example, with the position of the radar sensor at the origin of the raster, data of the adjoining address areas, G, H and K in FIG. 1, will also be processed in one revolution of the radar antenna without taking countermeasures.

As seen from the above, the data register 9 consists of 24 bits, which are transferred to the buffer register 15 via switch 14; thereafter the radar video data is stored in the random access memory 10. This data is written into the 7 submemories simultaneously, but is transported to memory 10 in serial form, as the data for writing into the 7 submemories can be delivered serially in 7 words within the cycle time by the address generating circuit 1, the radar input buffer 11 and the validity circuit 13.

The readout frequency of the video data stored in memory 10 is 55 Hz to obtain a flicker-free display with high intensity. A horizontal row of 7 submemories are readout simultaneously for each picture line. Since each of these submemories consists of sixteen 1024 × 1 static RAM modules, 16 bits can be readout in parallel in accordance with that stated on page 7. Hence, to readout one picture line, the first 16 memory elements in a row of the respective 7 submemories are read first, then the next 16 memory elements in a row of the submemories, etc. In this way, 7 × 16 memory elements are readout in each memory cycle, so that a picture line of 896 memory elements is readout in 8 memory cycles. If each memory element consists of a single bit, seven 16-bit words are readout in parallel each memory cycle, but are transported in serial form to the buffer register 16. If, as already stated as an example, each memory element consists of three bits, 7 × 3 words of 16 bits are readout in parallel each memory cycle and transported in serial form through three channels to the buffer register 16 having a capacity 3 × as large. For the sake of convenience it is further assumed that a memory element consists of a single bit. The 10 words readout from the memory are applied to a readout unit 17, processing the supplied information to a form suitable for presentation on a raster scan display.

The sequence in which the elements of memory 10 are readout differs from the sequence required for the display of picture lines. For this reason the readout unit 17 contains a picture line memory 18 storing in succession the data concerning the picture elements.

0–15, 128–143, 256–271, 384–399, 512–527, 640–655, 768–783;
16–31, 144–159, 272–287, 400–415, 528–543, 656–671, 784–799;

112–127, 240–255, 368–383, 496–511, 624–639, 752–767, 880–895; which information is readout in the sequence 0–15, 16–31, 32–47, ..., 880–895. This write-read method is realized by the address generating circuit 19. The readout information is finally placed in the buffer register 20 and thence applied to a raster scan display.

To readout the random-access memory 10, an address generating circuit 21 is provided, generating the addresses of the picture elements readout in the aforementioned sequence for the consecutive picture lines. Since for the addressing in circuit 21 the same counters can be employed as for the addressing in circuit 19, the circuit 21 is shown connected to circuit 19 in FIG. 2. For the addressing and subsequent readout of memory 10, the address applied by circuit 21 is transported to the buffer register 15 via switch 14. The position of this switch therefore changes up and down to write and to readout radar data in memory 10 alternately for the purpose of presenting this data on a raster scan display. Switch 14 is operated by control signals provided by a timing unit not shown in FIG. 2; this timing unit also controls the entire system here described. A description of the timing aspects is considered to be unnecessary for a good understanding of the invention and is therefore omitted.

During a read/period R, the switch 14 is in the position other than shown to permit the readout of the data required for presentation on the raster scan display. During a RMW(read/modify/write) period the position of switch 14 is as shown. In the switch position shown in FIG. 2, it is possible to apply the data from the radar input buffer to the memory 10, whereby the data being stored may be the result of the data applied and the data already contained in the memory. Hence, as stated in the introductory of this description by a numerical example, an RMW period is about twice as long as an R period. However, this is considered of no importance for a good understanding of the invention.

It has been remarked that different information can be read from memory for two raster scan displays. For example, the entire information stored in the random-access memory may be displayed on one display and a certain part of this information on the other. If different information is read from memory for $\alpha$ raster scan displays, the expressions become:

$$\begin{cases} \alpha \dfrac{b^2}{qN} f_{p_1} + \dfrac{b\sqrt{2}}{N} f_h p_2 < 0.95 \times 10^6 & \text{(I)} \\ q = \left(\dfrac{b}{N}\right)^2 \dfrac{1}{1024} & \text{(II)} \\ \dfrac{b}{N} = 2^y & \text{(III)} \end{cases}$$

Substitution of II and I and insertion of the parameters mentioned in I yields:

$b < (218.7 \, N - 5.8 \, \alpha N^2)$.

As previously stated, $32\sqrt{q} = 2^y < 218.7$, which is satisfied only by the values $q = 1, 4$ and $16$, while $b/N$ can assume only the values 32.64 and 128. For $\alpha = 3$, the largest number of picture lines satisfying the relationship $b < (218.7 - 5.8 \, \alpha N^2)$, is $b = 320$ when $N = 10$. The use of 3 raster scan displays in the readout unit according to the invention therefore renders an enormous limitation on the number of picture lines and hence a considerable reduction in the accuracy of the picture presentation on the displays.

What we claim is:

1. A digital scan converter for displaying on a raster scan display video data provided by a radar sensor as a field of view is scanned in a predetermined pattern at a first scan rate, said converter comprising an input buffer for storing quantized video data at addresses corresponding to said predetermined pattern scanned at said first rate; a random access memory for storing data received from said input buffer, said random access memory comprising N × N submemories each having $a \times a$ memory elements and each being simultaneously accessible, wherein a range being considered at any given azimuth $\phi$ is divided into n segments each having $k$ range increments $\Delta r$, where $n \leq N$, so that the length $k \Delta r$ of each of said segments is equal to at least the range represented by "$a$" memory elements, multiplied by a factor $\sqrt{2}$; an address generating circuit for generating addresses as a function of said pattern and said first scanning rate to accommodate data read from said input buffer into said random-access memory at locations corresponding to a display line pattern to be produced on the raster scan display; said address generating circuit including an azimuth counter for generating signals representative of an azimuth $\phi$, a sine/cosine generator coupled to said azimuth counter for generating signals representative of $\sin \phi$ and $\cos$ φ, a start address generator coupled to said sine/cosine generator for producing start address values $lk \Delta r \cos \phi$ and $lk \Delta r \sin \phi$, where $l = 0, 1, 2, \ldots, n-1$, and an increment address generator for incrementing, during each random access memory cycle, each of n start addresses by $\Delta r \cos \phi$ and $\Delta r \sin \phi$ to thereby generate in $k$ successive memory cycles the addresses $x = x_c + (lk+m) \Delta r \cos \phi$ and $y = y_c + (lk+m) \Delta r \sin \phi$, where $x_c$ and $y_c$ represent the coordinates of the radar sensor position, $l = 0, 1, 2, \ldots, n-1$ in each memory cycle, and $m = 0, 1, 2, \ldots, k-1$, the data stored in said input buffer corresponding to the n ranges of which the addresses are defined in each memory cycle, being transferred to the $x$ and $y$ address-defined positions of said random-access memory in the respective memory cycle, allocating a position within one submemory by one address only; and a readout unit for reading out data stored in said random-access memory at a second rate for display on the raster scan display, the data for each picture line being read out simultaneously from the respective N submemories, said readout unit including means for storing data for at least one picture line which are read out in the sequence required for presentation on the raster scan display.

2. A digital scan converter as claimed in claim 1, wherein the maximum number of picture lines $b$ in the raster scan display and the number of said submemories $N \times N$ is determined by the relationships:

$$\alpha \frac{b^2}{qN} f_t p_1 + \frac{b\sqrt{2}}{N} f_h p_2 < 0.95 \times 10^6$$

$$q = (\frac{b}{N})^2 \frac{1}{1024}$$

$$\frac{b}{N} = 2^y$$

where $f_t$ = the picture reproduction frequency;
$f_h$ = the pulse repetition frequency of the radar sensor;
$p_1$ = the number of μsec in a memory cycle when data for reproduction on the raster scan display are read from the random-access memory;
$p_2$ = the number of μsec in a memory cycle when data of the input buffer are read into the random-access memory for subsequent writing;
$\alpha$ = the number of raster scan displays for which different data are read from the random-access memory;
$q$ = the number of bits in which data may be read in parallel from each of the submemories in a memory cycle; and
$y$ = an integer.

* * * * *